United States Patent Office 3,824,208
Patented July 16, 1974

3,824,208
PROCESS FOR FORMING A FREE-FLOWING PARTICULATE POLYMER MIXTURE FROM A VISCOUS TACKY POLYMER
Ernest A. Link, Utica, Mich., and Marcel P. Scarbel, Scotia, N.Y., assignors to General Electric Company
No Drawing. Filed Mar. 5, 1973, Ser. No. 338,380
Int. Cl. C08g 51/04
U.S. Cl. 260—375 B         36 Claims

ABSTRACT OF THE DISCLOSURE

A process for producing a free-flowing particulate polymer mixture comprising adding from 15 and more preferably from 20 to 900 parts of a filler to 100 parts of a viscous tacky polymer having a viscosity of anywhere from 1000 centipoise to 200,000,000 centipoise at 25° C., and acting on that mixture until the ingredients are formed into a free-flowing particulate mixture. Prior to the application of reducing means to said mixture of filler and polymer so as to break it up into a free-flowing particulate mixture, there may be added various ingredients to the composition. In addition, these ingredients can be added to the filler and polymer simultaneously as the filler and polymer are being acted upon by various means so as to form the particulate mixture. The preferred means for acting upon the polymer and filler mixture so as to break it or reduce it to a free-flowing particulate mixture is mechanical shear means. The foregoing process is especially directed to the forming of a free-flowing particulate mixture from a diorganopolysiloxane polymer having a viscosity of 100,000 centipoise to 200,000,000 centipoise at 25° C. and a filler.

BACKGROUND OF THE INVENTION

The present invention relates to a process for forming a free-flowing particulate mixture from tacky viscous polymers and fillers that are normally incorporated into said viscous tacky polymers, and in particular the present invention relates to the formation of a free-flowing particulate mixture from viscous tacky polymers and fillers by the use of mechanical shear means.

In the past there was a great deal of difficulty in processing viscous tacky polymers. More particularly, there was a great deal of processing difficulty as well as economic losses resulting from the difficulty of processing cohesive tacky polymers during the portion of the process where various materials such as fillers were desired to be incorporated into such polymers for forming the final desired composition.

As is well known, most synthetic and natural rubbers are solid rubbery materials at room temperature. Examples of such synthetic rubbers as well as natural rubber are, of course, the polyisoprenes, polychloroprenes, ethylene-propylene rubbers, polybutadiene rubbers, the synthetic rubbers that are copolymers of butadiene and styrene, cis-polyisoprene which, of course, is natural rubber and butadiene acrylonitrile copolymers, as well as other types of synthetic rubbers. These synthetic rubbers are, in fact, rubbery solids at room temperature. Thus, it is very difficult to incorporate additional desired ingredients into these rubbers except by heating the rubbers to elevated temperatures, that is, temperatures in excess of 50° C. and then adding the ingredients to the flowable synthetic rubber or natural rubber mass utilizing a prolonged and expensive mixing cycle. It would be eminently desirable in these synthetic rubbers if ingredients could be added to the synthetic and natural rubbers by a simple operation and then the resulting composition could be taken and processed further with ease.

The above difficulties experienced with natural and synthetic rubbers is also to be found with thermoplastic organic materials such as, polystyrene, polyethylene, polyacrylonitrile, polycarbonates, polyacrylates, polypropylenes and polyvinylchlorides as well as other well known thermoplastic materials. Thus, as is the case with natural and synthetic rubbers such thermoplastics are nonflowing solids at room temperature but will flow at temperatures in the range of 50° C. to 200° C. Currently, such plastics will be taken and broken or ground up and then the desired ingredients added to the resulting particulate mixture so as to form a uniform dispersion of the thermoplastic polymer and the other ingredients that are added to it. As can be visualized, such grinding and reduction operations on solid thermoplastic materials can be very costly and time consuming. In addition, in certain cases, the thermoplastic material is heated to elevated temperatures, that is, in the range of 50° C. to 200° C., and then there is added to the molten material the desired ingredients and then through a difficult and time consuming operation the desired ingredients are uniformly mixed into the molten thermoplastic material. Accordingly, it is extremely desirable to find a simple process for the reduction of natural and synthetic rubbers as well as thermoplastics to a free-flowing particulate form during which process the desired ingredients could be mixed into the polymers.

The above is also true of silicone polymers. Thus, silicone polymers such as, diorganopolysiloxane gums or silanol-stopped diorganopolysiloxane polymers are very viscous, tacky, cohesive and flowable materials at room temperature. Such silicone polymers which are the basic ingredients in heat vulcanizable silicone rubber compositions and room temperature vulcanizable silicone rubber compositions are even flowable at extremely low temperatures, that is, temperatures below 0° C.

At the present time, the mixing procedures for mixing the desired ingredients such as, fillers and other additives to such diorganopolysiloxane gums as well as to silanol-stopped diorganopolysiloxane polymers so as to produce a uniform mixture which can be vulcanized at a later time to produce a silicone rubber composition either at elevated temperatures or at room temperature as the case may be is very costly and time consuming. In addition, even after the uniform mixture is formed, the mixture is hard to process. There is a high labor cost in handling the filler, diorganopolysiloxane gum mixture so that it may be further operated upon. In addition, it is very difficult to convey from one operation to another the diorganopolysiloxane gum filler mixture. The above is also true with respect to the incorporation of a filler in a silanol-stopped diorganopolysiloxane polymer that is utilized to produce one-part room temperature vulcanizable silicone rubber compositions and two-part room temperature vulcanizable silicone rubber compositions.

Thus, as with the synthetic and natural rubbers and the thermoplastics, the present procedure for taking the basic silicone polymer and incorporating into it the basic ingredients and then processing it to the point to which it is sold requires difficult processing, considerable handling of the material which, of course, raises the labor cost and bulky conveying machinery which slows the production of the formation of heat vulcanizable silicone rubber compositions and room temperature vulcanizable silicon rubber compositions.

Thus it can be seen that the prior process for forming heat vulcanizable silicone rubber compositions and more particularly the mixing of the desired ingredients into the diorganopolysiloxane gum was time-consuming and costly, both in terms of the use of manual labor as well as with respect to the tieing up of machinery for excessive periods of time as is the case of the doughmixer so as to form the uniform mixture of the diorganopolysiloxane gum and filler.

The process for producing silanol end-stopped room temperature vulcanizable silicone rubber compositions is equally time-consuming and costly in that the incorporation of the filler as well as other ingredients into the base silanol-stopped diorganopolysiloxane by the present procedure is difficult.

It is one object of the present case to provide a novel and efficient process for producing a free-flowing particulate mixture from a viscous tacky polymer in a very short period of time.

It is another object of the present invention to provide a novel and efficient process for producing an essentially uniform free-flowing particulate mixture from a viscous tacky polymer which free-flowing particulate mixture can be further processed easily.

It is an additional object of the present invention to provide a novel and economic process for forming a free-flowing particulate mixture from a viscous, tacky polymer, filler and other ingredients desired to be incorporated into the polymer.

It is still another object of the present invention to provide an efficient and economic process for producing a free-flowing particulate mixture from a diorganopolysiloxane gum, filler and other desired ingredients such that the free-flowing particulate mixture may be subsequently massed to form a heat vulcanizable silicone rubber composition.

It is yet another object of the present invention to provide a process for forming a free-flowing particulate mixture from a silanol end-stopped diorganopolysiloxane polymer, filler and other ingredients desired to be incorporated into the silanol-stopped diorganopolysiloxane polymer such that the resulting composition may be taken and utilized to form a room temperature vulcanizable silicone rubber composition.

As an example, in the past in heat vulcanizable silicone rubber compositions, it was common to prepare a high viscosity polymer or gum which was the basic ingredient of the heat vulcanizable silicone rubber composition and would generally comprise a diorganopolysiloxane polymer or gum having a viscosity of 100,000 to up to 200,000,000 centipoise at 25° C.

The gum was then taken and transported to a doughmixer. Then there was added to the gum in the doughmixer the requisite amount of reinforcing fillers or extending fillers, heat stabilizers, flame retardant additives, processing aids and other types of ingredients that are normally associated or present in heat vulcanizable silicone rubber compositions.

The doughmixer comprises a large tank with two large mixing blades therein which agitate and mix the gum and the other ingredients into a uniform mixture. Normally, it takes a doughmixer from a minimum of 6 hours to a maximum of 48 hours to form a uniform homogeneous mass of the diorganopolysiloxane gum, filler and other ingredients. A normal batch that is utilized in a doughmixer comprises about 5000 pounds of gum, filler and the other ingredients specified above. It must be noted that, irrespective, of whether the batch is as small as 400 pounds or as large as 5000 pounds the time necessary for the doughmixer to form a homogeneous mass of the diorganopolysiloxane gum, filler and other ingredients is about the same.

After the doughmixing cycle is completed, the compound is taken out of the doughmixer. Usually the doughmixer has to be scrapped to remove amounts of the diorganopolysiloxane gum, filler and other ingredients of the homogenous mass that is formed or mixed in the doughmixing cycle. The resulting mass is then dumped into a cart and from there forced through an extruder. During the extrusion, the cut slabs are passed through a screen so as to remove foreign particles from the mass and also so as to form them into packageable 50 pound slabs. The resulting slabs are then packaged and shipped or they may be taken and processed through other extruding and forming machines before they are shipped. In addition, in some cases, the 50 pound slabs are taken and processed on a mill at which point a curing catalyst may be added and the resulting milled mass can then be extruded into the desired shape and shipped as such. Then, in one case, the customer receives an uncatalyzed mass which he may take and mill into it the necessary amount of catalyst and then finally cure it at elevated temperatures to form the final heat-cured silicone rubber mass. In the other case, where the consumer or customer obtains the catalyzed formed mass, he then takes the formed mass and utilizes as desired in his operations.

The most time-consuming part of this process is the forming of the gum and filler mixture into the desired homogenous mass in the doughmixer. As stated previously, it takes anywhere from 6 hours to as much as 40 or more hours, irrespective of the size of the mass, to produce a uniform homogenous mass in the doughmixer from the gum, filler and other ingredients.

SUMMARY OF THE INVENTION

In accordance with the above objects, there is provided by the present invention a process for producing a free-flowing particulate mixture from a viscous, tacky and cohesive polymer and filler comprising (a) reducing said polymer to particles of the size ranging from 0.1 microns to 25.4 millimeters comprising (b) mixing the particles of polymer with at least 15 parts of filler per 100 parts of the polymer, and (c) recovering the resulting free-flowing particulate mixture.

The polymer as identified above may be a synthetic rubber or a natural rubber as identified previously or a thermoplastic polymer, whereupon the process takes place and the reduction of the polymer to a particulate mixture takes place at a temperature range of 50° C. to 200° C. The polymer may also be a silicone polymer either a triorganosilyl end-stopped diorganopolysiloxane gum or a silanol-stopped diorganopolysiloxane base fluid for room temperature vulcanizable silicone rubber compositions, wherein the process takes place at a temperature range of 0 to 100° C. and more preferably 25 to 60° C.

As can be understood, the temperature range of 50° to 200° C. for the natural and synthetic rubbers as well as the thermoplastic materials is needed in order for the polymers to be in a flowable condition. In addition, with respect to the silicone polymers, even though the temperature of the process may exceed 100° C., it is desirable that it be kept below this temperature since with silicone polymers the free-flowing particulate mixture that is formed is produced in a finer and smaller particle size than is the case when the temperature exceeds 100° C., such as say up to 200° C.

The reduction of the polymer to particles with the filler essentially uniformly dispersed on the particles as well as other ingredients uniformly dispersed on the particles may be carried out by adding all the ingredients in the initial part of the process or the filler and other ingredients may be added to the polymer while the polymer is being reduced to a free-flowing particulate size, that is, simultaneously as the polymer is being broken up to a free-flowing particulate size, the filler and the other ingredients may be added to it. The breaking down or reduction of the polymer to a free-flowing particulate form is preferably carried out with shear means which preferably may be any of various kinds of agitators. However, it is to be noted that the present invention is not limited to such mechanical shear means. The reduction of the polymer and filler mixture as well as other ingredients to particulate form may take place by any means that can be utilized to break up the polymer into small particles such as, dissolving the polymer and the filler in a solvent and then evaporating the solvent in various ways.

It should also be mentioned that the shearing means that may be utilized to break up the polymer in accordance with the present invention is not limited solely to mechanical shearing means but it may be any type of shearing means that can function effectively in the process of the present case, such as, high velocity impingement of a polymer stream on a solid surface in a chamber containing a dense cloud of filler so that polymer particles are immediately coated with filler.

Generally, there may be utilized up to 900 parts of filler per 100 parts of the polymer. Preferably, there is utilized 20 to 900 parts of filler and more preferably 20 to 400 of filler per 100 parts of the organopolysiloxane polymer.

Thus, in the more specific embodiment of the present invention, the process comprises a process for producing a free-flowing silicone polymer particulate mixture comprising (a) adding from 20 to 400 parts of filler selected from the class consisting of reinforcing fillers and extending fillers and mixtures thereof to 100 parts of an organopolysiloxane polymer having a viscosity of 100,000 centipoise to 200,000,000 centipoise at 25° C. of the formula, (1) 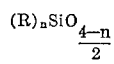

where R is selected from the class consisting of monovalent hydrocarbon radicals, halogenated monovalent hydrocarbon radicals and cyanoalkyl radicals, $n$ varying from 1.95 to 2.1, inclusive, (b) having shear means act upon said filler and organopolysiloxane which is preferably a mechanical shear means having a mixing blade radius that may vary from 1 to 108 inches and said mechanical shear means has a blade speed that may vary from 400 rotations per minute to 25,000 rotations per minute until there is formed a free-flowing particulate mixture. The time of agitation may vary anywhere from 60 seconds to 60 minutes, and more preferably varies from 60 seconds to 30 minutes. The blade radius of the mechanical shear means is preferably varied from 3 inches to 17 inches and has a blade speed that may vary from 400 rotations per minute to 8,000 rotations per minute. The reinforcing filler is, of course, well known and is selected from the class consisting of silica aerogel, fumed silica, treated fumed silica, precipitated silica, treated precipitated silica, and mixtures thereof. The temperature at which the process is carried out for silicone polymers is generally between 0° and 100° C. and most preferably from 25° to 60° C.

In addition to the organopolysiloxane gum of Formula (1) above and to either reinforcing fillers, extending fillers or mixtures thereof, there may be added to the vessel in which the mechanical shear means operates 1 to 25% by weight of the organopolysiloxane of Formula (1) of a silicone process aid and 1 to 10% by weight of an additive selected from the class consisting of said bonding additives, heat stabilizer additives, flame retardant additives, and mixtures thereof.

In an alternative embodiment, there may also be added to said mechanical shear vessel prior to the agitation to form the desired free-flowing particulate mixture, 0.5 to 10% by weight based on said diorganopolysiloxane gum of a curing catalyst which may be a peroxide curing catalyst such as, t-butyl perbenzoate. The curing catalyst in the mixing procedure is only added if the vessel is refrigerated or cooled to a temperature about 40° C. or below so as to prevent the heat vulcanizable silicone rubber composition from curing in the vessel.

In an additional more specific embodiment of the present invention, there is provided a process of generally (a) adding from 15 to 400 parts of a filler selected from the class consisting of reinforcing fillers, extending fillers and mixtures thereof to 100 parts of a silanol-stopped diorganopolysiloxane polymer having a viscosity of 1,000 centipoise to 10,000,000 centipoise at 25° C. of the formula, (2) 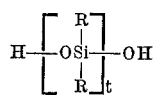

where R is selected from the class consisting of monovalent hydrocarbon radicals, halogenated monovalent hydrocarbon radicals and cyanoalkyl radicals, where $t$ varies from 300 to 5,210, (b) utilizing shear means to operate upon said filler and silanol-stopped diorganopolysiloxane where the mechanical shear means has a mixing component radius that may vary from 1 to 108 inches and said agitator has a mixing component that can operate from 400 rotations per minute to 25,000 rotations per minute until there is formed a free-flowing particulate mixture. The temperature range in which this specific process is carried out as well as the time of mixing is the same as in the specific embodiment for forming the free-flowing particulate mixture from the diorganopolysiloxane gum. It must be observed that when other ingredients are added to said silanol-stopped diorganopolysiloxane polymer and filler mixtures and in particular the cross-linking agent and the catalyst, the mixing process must take place under anhydrous conditions and even more specifically under vacuum, so that the resulting free-flowing particulate mixture is kept anhydrous. In the case of the formation of the free-flowing particulate mixture for use in two-package room temperature vulcanizable silicone rubber compositions, then small amounts of water can be tolerated. In the case where the free-flowing particulate mixture is formed from the diorganopolysiloxane polymer of Formula (1), the process can be carried out either under vacuum, atmospheric pressure or elevated pressure, although the simplest procedure is to use atmospheric pressure.

By the above process, there is obtained a free-flowing particulate mixture in which the particles have a diameter that generally may vary from 0.1 microns to 25.4 millimeters and more preferably may vary from 0.1 microns to 4,000 microns. In the case where a powder is desired, more specifically, the particles may vary from a diameter of 0.1 microns to 100 microns, which particles can be massed together into a cohesive mass by applying shearing action to the particles which are of essentially uniform composition.

The particle size is only limited by the desired diameter of the particles so that they may have the desired free-flowing properties so that they can be handled easily and conveniently. The particles are essentially spherical with an interior polymer portion which is essentially uniformly covered with filler and other ingredients that were added to the polymer and filler mixture prior to its reduction to a free-flowing particulate mixture. Thus, it is obvious that the worker skilled in the art can choose the particle size he desires which would be most suited for his processing operation.

DESCRIPTION OF THE PREFERRED EMBODIMENT

As noted previously, the process of the present case can be applied to any synthetic rubber, natural rubber or thermoplastic material which at elevated temperatures is a viscous flowable mass which is very difficult to handle and process into a finished product which is to be sold. Representative examples of such thermoplastic materials as well as natural rubber and organic rubber were given previously. These materials, as silicone polymers, are difficult to handle with respect to the mixing of various fillers and other ingredients into these polymers to produce the final finished product that is sold. Thus, the present process provides a means by which the various desired ingredients for these polymers can be mixed into the polymer and then the resulting free-flowing particulate mixture can be taken and processed further as desired without the costly handling and conveying that is experienced and utilized in present day operations. As pointed out previously, the process of the present invention results in the polymer, filler and other ingredients being mixed and formed into a free-flowing particulate form in which the various ingredients and polymers in a particular particle are essentially uniform in composition as compared to any other particle in the mixture. Thus, the upper limit of the sizes of the particles is limited by the size particles that can be obtained which will be essentially uniform in composition and also be free-flowing so that they can be further processed easily or even sold as such. Accordingly, in a broad generic form, the process of the present invention is applicable to forming particles of essentially uniform composition that may vary in diameter anywhere from 0.1 microns to 12.5 millimeters, which particles are essentially spherical and have a center portion of polymer which is essentially uniformly covered with filler and the other ingredients that were added during the reduction of the polymer to particles. More preferably, the particles which are of essentially uniform composition and are readily free-flowing or in a more or less powder form are particles that can be produced by the process of the present case that have a diameter that may vary from 0.1 microns to 4,000 microns. Of course, the process of the present case can be utilized to form an even more specific and more narrow range of particle size in the particulate mixture such that the particulate mixture is essentially a powder.

Thus, in a more specific embodiment, the process of the present case can be utilized to produce a free-flowing powder mixture wherein the particles are of essentially uniform composition and have a size that may vary anywhere from 0.1 microns to 100 microns in diameter.

The advantages of this most narrow range of particle size as set forth above is the fact that the resulting particulate mixture is very free-flowing and very easy to handle. Irrespective of the size, the worker skilled in the art by utilizing the process of the present invention can obtain the particle size he desires for his particular manufacturing procedure and which particle size is most suited to fulfill the requirements of his customers. At any particle size, the particles formed by the process of the present invention can be massed together on a mill or by other means so as to form a cohesive polymer mixture, either at room temperature or at elevated temperatures which would be in the case of the synthetic rubbers, natural rubbers or thermoplastic materials, that is, a temperature in which the particles would be massed through an extruder or other means at a temperature in the range of 50° to 200° C.

With respect to silicone polymers and particularly the silicone polymers identified above, it is preferred that this massing operation take place at room temperature on a mill or other convenient massing instrument that applies shearing action to the particles that it operates upon.

As has been mentioned, any type of agitator or mechanical shear means may be utilized in the process of the present case to break up the polymer and particularly the silicone polymers into particulate form and mix these particles with the desired amount of filler and other ingredients. Examples of such mechanical shear means and particularly the ones that are most preferred in the preferred embodiment of the present invention are high speed mechanical agitators.

Any type of agitator may be utilized to mix the diorganopolysiloxane gum and filler whether it be an extending filler or reinforcing filler to form the desired silicone rubber powder of the present invention. The only requirement is that the agitator have the right combination of blade size as correlated to blade speed. Thus, generally, it is preferred that the utilized agitator have a blade size radius that may vary from 1 inch to 108 inches and a blade speed that may vary from 40 to 25,000 rotations per minute or more.

In a more preferred embodiment, it is preferred that the blade speed be correlated with the blade radius. Thus, with a blade radius of 1 inch or less it is preferred that the blade speed be 25,000 rotations per minute or more. With a blade radius of 108 inches, it is generally preferred that the blade speed be at least 40 rotations per minute and preferably more than 40 rotations per minute such as, 100 to 200 rotation per minute. Thus, within the general limits set forth above, the larger the size of the mixing blade radius, the lower it is preferred that the blade speed be in rotations per minute.

In a more preferred embodiment, it is preferred that the blade radius vary from 3 inches to 24 inches and the blade speed for this blade radius range may vary from a low limit of 400 or more rotations per minute for the blade radius of 17 inches to a speed of 8000 rotations per minute or more as the blade radius approaches 3 inches. Thus, the larger the blade radius, the lower the blade speed that can be tolerated. On the other hand, the smaller the blade radius, the larger the rotations per minute speed of the blade must be within the limits set forth above. It is theorized that what actually creates free-flowing particles or imparts sufficient energy to the polymer/filler mixture to create the particles is the energy the rotating blade imparts to the mixture of polymer and filler and that this is most closely measured by the blade tip speed. Thus, in accordance with this theory and in accordance with the correlations set forth above, it is generally desired that the blade tip speed have a velocity that varies from 50 feet per second to 500 feet per second and most preferably it is desired that the blade tip speed have a velocity that varies from 70 feet per second to 150 feet per second. The most preferred blade tip speed is 130 feet per second, in terms of a working agitator and commercial agitator that may be utilized in the process of the present invention to form heat vulcanizable silicone powder from a diorganopolysiloxane gum and from a filler as well as with the addition of the other ingredients that may be present in heat vulcanizable silicon rubber compositions. As has been stated, the blade radius may vary anywhere from 1 inch to 108 inches with a speed in which the 1 inch radius is related to a speed of 25,000 rotations per minute and the 108 inch radius blade is related to a blade speed of at least 40 rotations per minute and that by varying the blade speed and rotations per minute within the broad ranges of blade size radius as indicated above, one will obtain an agitator for a given blade radius at which the blade is rotating at a sufficient speed in rotations per minute so as t impart sufficient energy to the diorganopolysiloxane gum and filler mixture so as to form free-flowing heat vulcanizable silicone rubber particles therefrom.

It should be pointed out there are various commercial mixers which do have the appropriate blade radius and the proper rotations per minute in accordance with the foregoing general correlations of blade radius to blade speed in rotations per minute to meet the requirement set forth previously so that the commercial mixer has a sufficiently large blade radius and the blade of that given radius is travelling at a sufficient velocity in rotations per minute so as to form heat vulcanizable silicone free-flowing powder. Such mixers can handle or utilize batches of about 500 pounds of a mixture of diorganopolysiloxane gum, filler and the other ingredients that are normally present in heat vulcanizable silicone rubber compositions so as to form from the 500 pound mixture a quantity of about 500 pounds of heat vulcanizable silicone rubber powder.

One example of such commercial mixers is the Henschel mixers or agitators manufactured by the Rheinstahl Henschel AG, Kassel, West Germany and sold by Koehring Company, HPM Division, Mount Gilead, Ohio 43338.

Another type of blender that can be utilized in the process of the present invention to form free-flowing heat vulcanizable silicone rubber particles is, of course, the Waring Blendors which have a blade radius of 1 inch or so and which run at a speed of from 14,000 r.p.m. to as high as 25,000 r.p.m. It is, of course, known that such small quart size Waring Blendors are only useful for laboratory demonstrations in the process of the present invention and would probably not be utilized in commercial manufacturing operations.

Utilizing an agitator as defined above having the appropriate blade radius and the blade moving at the appropriate blade velocity in rotations per minute, it is necesary with any given quantity of polymer, filler and other common additives that may be added to heat vulcanizable silicone rubber compositions that the agitator operate for a certain minimum time to form the free-flowing particles. Generally, it has been found that the agitator must operate for at least 60 seconds so as to form free-flowing particles from the mixture. On the other hand, it has been found that after the free-flowing particles have been formed and if the agitator is operated from beginning to end the operation of forming heat vulcanizable free-flowing powder for more than 60 minutes then some particles may begin to mass and form gloubles or small clumps which is not desired. Accordingly, in the present process for forming heat vlucanizable silicone-free-flowing particles, it is generally desired that the agitator be operated for a period of time of from at least 60 seconds to no more than 30 minutes.

It should also be pointed out that there is also a correlation between the blade size or blade radius and the weight amount of polymer, filler and other necessary ingredients for forming a heat vulcanizable silicone rubber composition which may be present in the mixture that is to be formed into free-flowing particles. Thus, there is a correlation within a given blade radius of the agitator and the volume of mixture that can be mixed to form free-flowing powders. Generally, with the blade radius of 108 inches or in the vicinity of 108 inches, it is possible to agitate and form into free-flowing particles mixtures of silicone polymers, fillers and other ingredients which may weigh as much as 5000 pounds or more. On the other hand, with a blade radius of only 1 inch, it is very difficult to handle more than half a pound of the desired mixture which is to be formed into the silicone free-flowing particles. With the 4-inch blade radius Henschel mixer, it is possible to form silicone free-flowing powders that may weigh as much as 8 pounds. With the 17-inch blade radius Henschel mixer, which agitator has a high blade speed of as much as 860 rotations per minute, it is possible to form or agitate into free-flowing silicone rubber powder, mixtures of silicone polymers, fillers and other necessary ingredients which may weigh as high as 250 pounds or more.

The process of the present invention can be carried out either under refrigerated conditions or at elevated temperatures for silicone polymers. Most preferably, the process is carried out at room temperature for silicone polymers, that is, the mixing kettle is cooled by ambient air circulation or by forced air circulation or water circulation, so that the free-flowing materials that are being formed in the agitator kettle are maintained at approximately room temperature. Generally, the temperature of the material that is being agitated or broken up into a powder by the agitator during the process should not exceed 100° C., since if this temperature is exceeded, the free-flowing materials that are formed tend to mass into globules and other agglomerates.

In the more preferred embodiment of the present invention, the temperature of the ingredients in the agitator vessel are maintained at a temperature in the range of 25° C. to 60° C. It should be pointed out that these ingredients may also be refrigerated to below room temperature such as a temperature of 15° C. or 10° C., by refrigerating the agitator vessel or by other means. However, such a cooling operation of the mixing vessel during the process for forming the heat vulcanizable silicone powder is not preferred since it is more difficult to form free-flowing powder when the mixture is cooled to below room temperature.

Another necessary limitation in the process of the present invention for forming silicone free-flowing particles is that there must be a certain amount of either reinforcing filler or extending filler or a combination of reinforcing and extending fillers in relation to the diorganopolysiloxane gum present so as to form particles during the process. Thus, generally, per 100 parts of the silicone polymer having a viscosity of 100,000 centipoise to 200,000,000 centipoise at 25° C. of Formula (I) above or the silicone polymer of Formula (2) above, there is generally added at least 15 parts of filler, which filler may be reinforcing filler alone, an extending filler alone or a mixture of reinforcing and extending fillers, which amount of filler is necessary in order to form free-flowing particles in accordance with the process of the present invention. In terms of any particular filler, there may be added as much as 900 parts of such a filler per 100 parts of the diorganopolysiloxane polymer of Formula (1) or (2) in order to form silicone free-flowing particles. However, no more than 400 parts of total filler should be added per 100 parts of the diorganopolysiloxane of Formula (1) or Formula (2) in forming free-flowing particles in accordance with the process of the present invention to produce a desired heat vulcanizable silicone rubber composition. Preferably, there is utilized from 20 to 300 parts of total filler and, more preferably, 30 to 100 parts of total filler per 100 parts of the diorganopolysiloxane of Formulas (1) and (2).

However, there may be utilized in accordance with the present invention quantities of filler considerably above 400 parts of filler per 100 parts of polymer. Thus, there may be utilized as much as 900 parts of a particular filler or mixtures thereof to 100 parts of polymer when it is desired to form a free-flowing particulate masterbatch.

The amount of 20 to 400 parts of filler may be an extending filler or a mixture of extending fillers, or it may be one type of reinforcing filler or a mixture of various types of reinforcing fillers or it may be a mixture of one type of reinforcing filler and one type of extending filler. In addition, there may be present a mixture of various types of reinforcing fillers whether treated or untreated and a mixture of various types of extending fillers whether treated or untreated. Normally, extending fillers are not treated by any particular process before they are utilized in heat vulcanizable silicone rubber compositions. Generally, there is no upper limit to the amount of filler that may be utilized other than the amounts and types of fillers that are desired in combination with the diorganopolysiloxane polymer in order to form the desired final silicone rubber composition, that is, a final vulcanized silicone rubber composition that has the desired properties, in terms of the amount and type of filler that is utilized to prepare said vulcanized silicone rubber composition.

The reinforcing fillers that may be utilized in the present invention are untreated fumed silica, untreated precipitated silica, silica areogel, treated silica aerogel, treated fumed silica, by whatever process and treated precipitated silica filler by whatever process. Reinforcing fillers such as fumed silica and precipitated silica, may be treated for utilization in vulcanizable silicone rubber compositions as disclosed, for instance, in Lucas, U.S. Pat. 2,938,009, which involves treating the silica filler with a cyclic siloxane so that a certain amount of diorganosiloxy groups will be appended or substituted or joined to the hydroxyl groups in the silica filler. Reinforcing fillers such as precipitated silica or fumed silica, may also be treated with a silicone nitrogen compound, such as a silicone amine compound as that disclosed in U.S. Pat. 3,024,126. There are other methods for treating fumed silica and precipitated silica which are the reinforcing fillers in accordance with the present invention. Such advanced methods for treating the silica fillers are that such fillers are treated with a hydroxyl amine and a silazane compound in separate and independent steps or are treated with a hydroxyl amine or cyclic siloxane and silazane compound as disclosed in U.S. Pat. 3,635,743. The disclosure of the above foregoing patents are incorporated into the present specification by reference.

There are other methods for treating silica fillers, both fumed silica and precipitated silica, which are the subject of other patents, which patents are so extensive they will not be referred to here in the present specification by number. Suffice to say that the process of the present invention for forming a free-flowing heat vulcanizable silicone powder encompasses the use of all types of reinforcing fillers, including fumed silica fillers and precipitated silica fillers, whether treated or untreated and that such reinforcing fillers may be used alone or in combination with one or various types of extending fillers in the process of the present invention for forming a free-flowing vulcanizable silicone powder.

The extending fillers are also well known fillers in the prior art, that is, the extending type of fillers that may be utilized in heat vulcanizable silicone rubber compositions. Such types of extending fillers which are well known as being utilizable in heat vulcanizable silicone rubber compositions can be utilized in the invention of the instant case to form free-flowing vulcanizable silicone powder. Such extending fillers are, for example, titanium dioxide, lithopone, zinc oxide, zirconium silicate, iron oxide, diatomaceous earth, calcium carbonate, glass fibers, magnesium oxide, chromic oxide, zirconium oxide, aluminum oxide, crushed quartz, calcined clay, asbestos, carbon, graphite, cork, cotton, synthetic fibers, etc. Some of the above extending fillers are sometimes referred to as semi-reinforcing fillers but in the present application such semi-reinforcing fillers will be considered as extending fillers. Any of these fillers, both reinforcing and extending, may be utilized in the process of the present case with synthetic rubber, natural rubber and thermoplastic materials to form a free-flowing particulate mixture.

If the filler has more than 4.0% by weight of absorbed water or hydroxyl groups thereon, then it will be too wet and will tend to mass together to form clumps when it is agitated in the process of the instant case. More preferably, the above fillers should have a hydroxyl content and/or absorbed water content that may vary from .2 to 2% by weight. It is also desirable that the filler have a certain minimum surface area. This merely means that the filler be comprised of sufficiently small particles so that it can be easily dispersed and mixed with the silicone polymer to form free-flowing silicone particles. Thus, generally the fillers that are utilized in the instant case to form free-flowing silicone powders should have a surface area of at least 10 square meters per gram and, more preferably, a surface area of 25 to 500 square meters per gram or more. It can easily be understood that the higher the surface area of the filler is, the finer the filler particles will be and the more easily it will be dispersed into the silicon polymer to form free-flowing silicone particles. Thus, most preferably, there is utilized in the process of the instant case to form free-flowing silicone particles, fillers having a surface area of 100, 200, 300 or more square meters per gram.

Utilizing the process of the instant case, preferably there is obtained a free-flowing silicone powder having a bulk density that may vary from 2 to 100 pounds per cubic foot and a particle size that may vary from 0.1 to 7000 microns. Most preferably, there is obtained a powder that has a bulk density that may vary from 3 to 70 pounds per cubic foot and a particle size of 0.1 to 100 microns.

The most preferred type of free-flowing silicone particles that can be made in accordance with the process of the instant case is the one having the bulk density and size in microns as indicated under the preferred ranges set forth above. Such a powder having the preferred bulk density and the preferred size in microns can be handled and shipped or processed through additional equipment in the manufacturing plant without difficulty.

The radical R in Formulas (1) and (2) above represents monovalent hydrocarbon radicals such as alkyl radicals, e.g. methyl, ethyl, propyl, octyl, octadecyl radicals, etc.; aryl radicals, e.g., phenyl, tolyl, xylyl radicals, etc.; aralkyl radicals, e.g., benzyl, phenylethyl radicals, etc.; cycloalkyl and cycloalkenyl radicals, e.g., cyclohexyl, cycloheptyl, cyclohexenyl radicals, etc.; alkenyl radicals, e.g., vinyl, allyl radicals, etc.; alkaryl radicals; cyanoalkyl; and haloalkyl, haloalkenyl and haloaryl radicals, e.g., chloromethyl, chlorophenyl, dibromophenyl, trifluoromethylethyl radicals, cyanoethyl, etc. Preferably, at least 50 percent of the R groups in Formula (1) are methyl radicals and the rest are phenyl radicals. Further preferably, 0.1–1 percent of the R groups in Formula (1) are vinyl.

There are also within the scope of Formula (1) polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of Formula (1) having a viscosity at 25° C. that can vary from 100,000 to 200,000,000 centipoise at 25° C., which can contain both saturated and olefinically unsaturated hydrocarbon groups, may be carried out by any of the procedures well known to those skilled in the art. Such polysiloxanes can be produced by following a procedure involving hydrolysis of one or more hydrocarbon-substituted dichlorosilanes in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material, such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150° C. to produce and recover by evaporation a product consisting of low molecular weight cyclic polysiloxanes comprising, for example, about 85 percent of the tetramer and 15 percent of the mixed trimer and pentamer. When the hydrocarbons on the silicon atom are methyl, materials resulting from the presence of monomethyltrichlorosilane in this initial product produced from dimethyldichlorosilane remain as residue in the distillation vessel or tower.

The distillate consisting essentially of low molecular weight cyclic dimethyl polymers, free of any significant amount of monofunctional and trifunctional groups, is collected in a vessel. The then dried cyclic siloxane contains less than 5 p.p.m. of water. The cyclic methylvinyl and diphenyl cyclic siloxanes are prepared in the same way.

The pure cyclic siloxanes are added in the desired proportions in a reaction vessel so as to be subjected to an equilibration reaction to form the polysiloxanes of Formula (I). Thus, about 2.5–17 mole percent cyclic diphenylsiloxane can be added to 83–97.5 mole percent dimethyl cyclic siloxanes. If desired, and depending on the type of compound that is to be produced, 0.1–1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added as a polymerization catalyst, such as KOH. The KOH breaks the ring of cyclic siloxanes to form a potassium silanolate which has the formula,

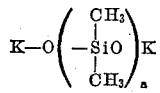

This compound, the potassium silanolate, thus can attack other cyclics to break the rings and increase the chain length of the siloxanes formed. There is further added to the reaction mixture an amount of one or more monofunctional compound calculated to function as end-blockers for limiting the degree of polymerization and consequently the lengths and molecular weights of the linear polysiloxane chains and for stabilizing the polymers. Usually, a small amount of monofunctional compounds are added to function as end-blockers so as to regulate the chain length of the polymers. Preferably, a compound is used as the chain-stopper having the formula,

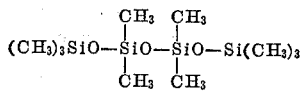

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until about 85 percent of the cyclic diorganosiloxanes have been converted to polymers end-stopped with monofunctional groups. When the 85 percent conversion point has been reached, there are just as many polymers being converted to the cyclic siloxanes as there are cyclic siloxanes being converted to the polymer. At that time, there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on the agitation, the remaining cyclic siloxanes may be removed by a gas purge.

The polydiorganosiloxane is produced so that it preferably registers a penetration of 50–4,000 mm. per minute on a standard penetrometer. Further, the polymer preferably has a molecular weight in the range of 10,000 to 2,000,000 and a viscosity of 100,000 to 200,000,000 centipoise or have preferably a viscosity that varies from 100,000 to 40,000,000 centipoise at 25° C.

Hydrocarbon-substituted polysiloxanes whose pendant groups consist largely of groups other than methyl, such as ethyl or other saturated hydrocarbon groups and olefinically unsaturated hydrocarbon groups other than, or in addition to, vinyl groups can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of trifunctional compounds, groups, or molecules to avoid crosslinking of linear polysiloxane chains through silicon and oxygen atoms and the incorporation therein of any significant amount of monofunctional compounds or radicals than those specifically provided to serve as end-blockers for limiting the degree of polymerization. Accordingly, the starting polydiorganosiloxane gum contains 2.0 hydrocarbon groups per silicon atom. Deviations from a ratio of 2 to 1, for example, ratios of 1.98 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

As has been stated previously, in producing the silicone rubber powder of the present invention there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 10 square meters per gram. Extending filler materials of a composition other than those preferred can be employed alone or in combination with the preferred fillers with good results. Such filler materials as titanium oxide, iron oxide, aluminum oxide, as well as the inorganic filler materials known as inert fillers which can include among others, diatomaceous earth, calcium carbonate and quartz, can preferably be employed in combination with the reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is also employed in the present process, 1 to 25 percent and preferably 5 to 15 percent by weight, based on the polydiorganosiloxane gum of a silicone process aid for preventing the gum and the filler mixture from structuring prior to curing and after compounding in which said silicone process aid is added to the agitator along with the polysiloxane and filler. One example of such a process aid is a compound of the formula, (2) 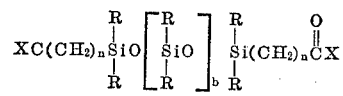

where R is a member selected from the class consisting of methyl and phenyl, X is a member selected from the class consisting of —OH, —NH$_2$ or —OR', where R' is methyl or ethyl, $n$ has a value of from 2 to 4, inclusive and $b$ is a whole number equal to from 0 to 10, inclusive. Further details as to the properties, as well as the method of preparation of the compound of formula (2), are to be found in the disclosure of Martellock, U.S. Pat. 3,464,945, which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of Formula (I). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. 2,954,357, which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated material include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one to seventy silicon atoms and up to about two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$, where X is any hydrolyzable group such as Cl, OR, H, —OOR and R is a monovalent hydrocarbon radical as previously defined. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids is to be found in Konkle et al., U.S. Pat. 2,890,188, the disclosure of which is being incorporated into this application by reference.

Any of the above process aids may be used alone or mixtures thereof may be used in the above-identified concentrations, which process aids are added to said agitator. Further, other suitable process aids which are known to be usable in forming heat vulcanizable silicone rubber compositions by the worker skilled in the art can be utilized in the process of the present case.

The curing of the silicone rubber composition of the present invention can be effected by chemical vulcanizing agents or by high energy electron radiation. More often, chemical vulcanizing agents are employed for the curing operation and any of the conventional curing agents can be employed. The curing agents may be added to the agitator so that there is formed in accordance with the present process a free-flowing silicone powder that is catalyzed. Alternatively, a free-flowing powder can be formed without a catalyst by not adding the catalyst to the agitator and the catalyst can be added to the powder in subsequent processing operations. The preferred curing agents are organic peroxides conventionally used to cure silicone elastomers. Especially suitable are the dimethyl peroxides which may have the structural formulas,

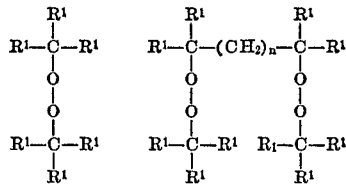

wherein $R^1$ represents the same alkyl group throughout or alkyl groups of two or more different types and $n$ is zero or a larger integer.

Among the specific peroxide curing catalysts that are preferred are tertiary-butyl-triethylmethyl peroxide, tertiary-butyl-peroxide, tertiary-triphenyl peroxide and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide, 2,4-dichlorobenzoyl peroxide, monochlorobenzoyl peroxide, benzoyl peroxide, etc. Generally, 0.1–10 percent of said peroxide by weight of the polydiorganosiloxane gum is used to cure the silicone rubber composition and preferably 0.5–3.0 percent by weight.

While the silicone rubber powder of the present invention can be produced by a number of methods, it is preferred that the process aid component be incorporated into the composition at a time immediately after the incorporation of the fillers into the silicone composition in the agitator. Thus, it is possible that the polydiorganosiloxane gum be mixed with the process aid in the agitator and then the desired amount of the filler is added in the agitator. Alternatively, the mixing operation can be carried out by mixing the polydiorganosiloxane gum, the process aid and the filler together at the same time in the agitator. After the mixing is completed and the powder is formed, the silicone rubber powder free of the curing agent may be heated to an elevated temperature of 170° C.–300° C. for two hours or more to devolatilize the powder particles. Further, this type of process aging provides opportunities for better wetting of the fillers by the gums in subsequent operations. In addition, the precure heat aging treatment provides the further advantage of effective elimination of objectionable volatile materials such as water and absorbed gases carried into the compounds by the fillers. The curing agent may then be mixed into the precured treated silicone rubber powder and then the composition is ready to be stored and cured whenever it is deemed desirable.

The amount of reinforcing silica employed with silicone gums to produce silicone compounds and silicone elastomers depends upon the tensile strength, as well as on the hardness properties, desired in the elastomer. Where high tensile strength and high hardness values are required, the filler employed will comprise for the most part a highly reinforcing silica and can contain various amounts of other types of extending filler materials. In the production of silicone elastomeric tape coatings or silicone elastomeric compounds, where high tensile strength and high hardness values are not as important, lesser amounts of reinforcing silica can be employed together with larger amounts of extending types of fillers.

When the reinforcing silica fillers employed in this invention are highly acidic in nature as, for example, having a pH of 4 or less, it is oftentimes desirable to add thereto onto the silicone compounds, materials which tend to neutralize the effects caused thereby. In such instances, buffers such as the alkaline earth compounds, including calcium zirconate, barium zirconate and the like, can be added in appropriate amounts to the fillers or to the mixture of polydiorganosiloxane gum, process aid and silica filler during agitation in the agitator.

In addtion to the addition of the diorganopolysiloxane gum, filler mixture that is placed in the agitator for formation into a free-flowing silicone powder, there may be added as pointed out above to the agitator silicone process aids, a curing agent or catalyst, if desired, and various other ingredients which are normally compounded into vulcanizable silicone rubber compositions during normal compounding operations. As pointed out previously, the curing agent or catalyst may be added to the agitator so that catalyzed free-flowing silicone powder may be formed by said agitator. Alternatively, the catalyst is added in subsequent operation and it is not added in the mixture of the diorganopolysiloxane gum, filler and process aids which are formed into a powder. Alternatively, the curing agent catalyst is added to the composition in a subsequent operation especially if it is desired to heat the powder at elevated temperatures greater than 40° C. so as to remove volatiles. If it is desired to add the catalyst in the mixing operation in the agitator which forms a free-flowing silicone powder, then preferably the agitator vessel is cooled or refrigerated by cooling fluid so as to maintain the mixing or agitation temperature as close as possible to room temperature.

Other ingredients that are well known to the worker skilled in the art may be added to the basic ingredients, the diorganopolysiloxane gum, filler and process aids which are present in the agitator are ingredients such as the various well known flame retardants, heat stabilizing agents, pigments and plasticizers other than the silicone process aids identified above. Suitable flame retardants include platinum compounds, antimony oxide, various polyhalogenated hydrocarbons and organic sulfonates, as well as other flame retardant compounds which are well known in the art. Stabilizing agents such as iron oxide are also well known to a worker skilled in the art as sometimes being necessary to be added into the silicone rubber composition. All such additional ingredients shall be added at a concentration of 0.1 to 10% by weight per ingredient based on the weight of the diorganopolysiloxane gum. If it is desired that the final vulcanizable silicone rubber powder should have heat stabilizing properties and particularly the final silicone rubber composition that is formed from the powder, then it is advisable to add a chemical such as iron oxide to the mixture that is agitated in the agitator to a free-flowing silicone powder. It is advisable to add iron oxide as well as other heat stabilizing agents to the silicone rubber ingredients that are present in the agitator prior to such ingredients being formed to a free-flowing silicone powder. As such, the heat stabilizing agents, in addition to iron oxide as well as various flame retardant additives, as well as various silicone inorganic plasticizers which are well known to a worker skilled in the art, as being necessary ingredients in certain types of vulcanizable silicone rubber compositions, can be added to the agitator prior to the formation of free-flowing powder.

In an alternative embodiment, it is preferred that all the ingredients including the curing agent or catalyst, be added together to the agitator vessel and then the agitator started so as to form uniform free-flowing silicone particles. Alternatively, there may be added to the agitator vessel first the diorganopolysiloxane gum and the desired amount of filler and then while the agitator is operating to form a free-flowing silicone powder, the other ingredients can be added in during the agitation period.

In the most preferred embodiment, all the ingredients that are desired in a particular silicone rubber composition to be formed from the free-flowing silicone powder are added together into the agitator vessel with the possible exception of the curing agent or catalyst and then the agitator is started up so that at the end of the agitation period there is formed free-flowing vulcanizable silicone particles in which powder or granules and the various ingredients are uniformly present therein. Of course, it is obvious that the addition of these other ingredients with the exception of the two basic ingredients needed to form the free-flowing silicone powder of the present case, that is, the diorganopolysiloxane gum and the filler, may be added at any time during the agitation cycle or may be added to the agitator vessel prior to the agitation cycle, as desired, and that other variations in the mixing operation in the agitator can be utilized as desired for the manufacture of a particular type of vulcanizable silicone rubber composition.

The present process for forming free-flowing silicone powder is preferably carried out at atmospheric pressure. In the alternative, the process for forming free-flowing silicone powder can also be carried out at a pressure such as 50 p.s.i.g. or up to 100 p.s.i.g. or under vacuum. However, the presence of pressure or vacuum is not desired in the agitator vessel since it results in the process becoming more involved. In the most preferred process of the present invention, it is preferred to utilize atmospheric pressure in the agitator vessel where the free-flowing silicone particles are formed.

A free-flowing particulate mixture may also be formed by utilizing the silanol-stopped diorganopolysiloxane of Formula (2) above and any of the reinforcing fillers and extending fillers as identified above. Such silanol-stopped diorganopolysiloxanes having a viscosity that may vary from 1,000 centipoise to 10,000,000 centipoise at 25° C. of Formula (2), are utilized to prepare one-part and two-part room temperature vulcanizable silicone rubber compositions. Such silanol-stopped diorganopolysiloxanes of Formula (2) are prepared in a manner similar to the process by which the diorganopolysiloxane gum of Formula (1) is prepared, that is, cyclic polysiloxanes are equilibrated with an alkali metal hydroxide catalyst. However, in the case where it is desired to produce silanol-stopped diorganopolysiloxanes, there is added a certain amount of water to function as an end-stopper for the silanol-stopped diorganopolysiloxane of Formula (2) that is formed. The amount of water that is added governs the end viscosity of the silanol-stopped diorganopolysiloxane as well as the average molecular weight of the silanol-stopped diorganopolysiloxane that is produced in the equilibration process. Thus, the amount of water that is added is such that a silanol-stopped diorganopolysiloxane polymer of formula (2) of the desired viscosity is obtained.

Another process by which the silanol-stopped diorganopolysiloxane polymers of Formula (2) may be formed is to take the diorganopolysiloxane gum of Formula (1), add some water to them and then equilibrate the mixture with the amount of water that is added into it which will determine the final desired viscosity of the silanol-stopped diorganopolysiloxane of Formula (2).

Another alternate method for forming the silanol-stopped diorganopolysiloxane of Formula (2) above, is by blowing steam across the surface of the high molecular weight product of Formula (1) above, or through the polymer for a sufficient length of time to obtain a desired low molecular weight component having the desired silanol content.

Thus, it is desirable to obtain a low molecular weight diorganopolysiloxane of Formula (2) from a portion of the high molecular weight diorganopolysiloxanes by the above water treatment which is well known to those skilled in the art.

In the case when it is desired to form a two-part room temperature vulcanizable silicone rubber composition, the process of the present invention would be utilized with the conditions set forth that were utilized with the diorganopolysiloxane gum of Formula (I), wherein the same fillers that are utilized with the diorganopolysiloxane gum of Formula (I) above, and utilizing the same conditions and time periods set forth with respect to the gum of Formula (I) is used to obtain a free-flowing particulate mixture with desired particle size. Of course, in this silanol-stopped diorganopolysiloxane of Formula (2) and filler mixture, there may be added the various ingredients that are found with the base component of conventional two-part room temperature vulcanizable silicone rubber compositions. These components or ingredients as well as the filler may be added to the silanol-stopped diorganopolysiloxane polymer of Formula (2), initially before the free-flowing particles are formed or during the process or procedure while the mechanical shear means is operating to form the free-flowing particles as was explained above with respect to the specific embodiment where the diorganopolysiloxane gum of Formula (I) is utilized to form a free-flowing particulate mixture. Thus, the free-flowing particle mixture that is formed with the silanol-stopped diorganopolysiloxane, of Formula (2) above, and filler and whatever other ingredients are desirable or conventional in the base compound of two-part room temperature vulcanizable silicone rubber compositions may then be packaged anhydrously in powder form. At any time thereafter, the second part of the two-part room temperature vulcanizable silicone rubber composition may be mixed with the powder base composition and allowed to cure as is normal for two-part room temperature vulcanizable silicone rubber compositions. The other part of the two-part room temperature vulcanizable silicone rubber composition as is known, comprises an alkyl silicate or a partial hydrolysis product of an alkyl silicate and a metal salt of a carboxylic acid. The alkyl silicate functions as a cross-linking agent and the metal salt of a carboxylic acid functions as the catalyst. Alternatively, the powdered polymer-filler mixture may be taken and massed together by shearing action such as on a roll mill, which massing must take place anhydrously or in the presence of only a very small amount of water and then the resulting massed composition can be packaged separately. The other part of this two-part room temperature vulcanizable silicone rubber composition, that is, the mixture of the alkyl silicate cross-linking agent and the metal salt of carboxylic acid may be mixed into the base composition at any time to form the cured two-part room temperature vulcanizable silicone rubber composition. It can be seen that the first procedure is preferred since the base polymer, that is, the silanol-stopped diorganopolysiloxane polymer, filler as well as other ingredients mixture which is formed to a free-flowing particulate form may be packaged as such immediately and then the applicator of the two-part room temperature vulcanizable silicone rubber composition can mix with it the cross-linking agent and the metal salt of a carboxylic acid and in the process mass the base composition and allow the resulting mass composition having the cross-linking agent and the catalyst in it to cure at room temperature to an elastomer.

An example of such a typical two-part room temperature vulcanizable silicone rubber composition as well as the additives that may be found in such composition is to be found in Lampe, U.S. patent 3,696,090, the disclosure of which is incorporated into the present specification by reference. Thus, the compositions disclosed in this patent as well as ingredients that are desired to be incorporated into the base polymer along with the silanol-stopped diorganopolysiloxane of Formula (2) above, and the desired filler may be utilized in the process of the present invention to form a free-flowing particulate mixture within the size ranges disclosed previously. It can be noted that the process of the present case can be used with any type of two-part room temperature vulcanizable silicone rubber composition having any of various additives which are disclosed in the patent literature as well as in scientific literature and the process of the present case will operate with such materials to form a free-flowing particulate mixture in which the particles have a size within the ranges indicated previously and will have a size within those ranges that is desired by the worker skilled in the art.

In addition, the process of the present invention can be operated anhydrously so as to provide a one-package room temperature vulcanizable silicone rubber composition such as that disclosed in Shaw, U.S. Pat. 3,701,753, in a free-flowing particulate form. The disclosure of U.S. Pat. 3,701,753 is incorporated into the present specification by reference. In addition, any other one-part room temperature silicone rubber comopsition may be operated on by the process of the present case to produce such compositions in a free-flowing particulate form with the particle sizes indicated previously. Examples of such other one-part room temperature vulcanizable silicone rubber compositions are, for example, to be found in U.S. Pats. 3,438,930, 3,541,044, 3,700,714 and 3,708,467. These U.S. patents are also incorporated into the present specification by reference.

The process of the present invention is operated under the same conditions and procedures for forming a free-flowing particulate mixture of one-package room temperature vulcanizable silicone rubber compositions as was used and as was discussed above with respect to the formation of free-flowing partciulate mixture from the diorganopolysiloxane gum of Formula (I). The concentration and the types of fillers as well as the mixing procedure is the same for the one-part room temperature vulcanizable silicone rubber composition as was the case with the process of the present invention when it was used to form a free-flowing particulate mixture from the diorganopolysiloxane gum of Formula (I) as was discussed above.

Simply repeating the procedure, the silanol-stopped diorganopolysiloxane within the scope of the compounds of Formula (2) above, is mixed with any of the fillers and concentrations of fillers discussed previously with respect to the formation of a free-flowing particulate mixture from the compound of Formula (I) above, and there is added to those components the desired cross-linking agent and the desired catalyst as well as any other additives that are desired. Typical cross-linking agents are the alkylacyloxysilanes and the alkylalkoxysilanes. Typical catalysts are the metal salts of carboxylic acids. In addition to these basic ingredients which are the cross-linking agent, the catalyst, the silanol-stopped diorganopolysiloxane of Formula (2) above and the filler, there may be added other desired additives to the basic composition in the mixing vessel. Then the mechanical shear means will then act upon the mixture under the conditions discussed previously to form a free-flowing particulate mixture wherein the particles are in the range of sizes discussed previously as desired by the worker skilled in the art.

The only important distinction in carrying out the process of the present invention when it is utilized to form a one-package room temperature vulcanizable silicone free-flowing particulate mixture as distinguished from the free-flowing heat vulcanizable silicone rubber particulate mixture is that the process must be carried out completely anhydrously, otherwise, the one-package room temperature vulcanizable silicone rubber composition will start to cure to form an elastomer. The one-package room temperature vulcanizable silicone rubber particulate mixture that is formed within the particle sizes either the broad generic particle sizes or the most specific particle sizes, may be taken and massed first on a roll mill or what have you anhydrously and then packaged or it may be conveniently packaged in inhydrous form as a free-flowing particulate mixture which may then be massed by shearing action when the applicator takes the one-package room temperature vulcanizable silicone rubber particulate mixture and applies it so as to form a cured silicone rubber elastomer at room temperature. It can be seen, irrespective, of the type of silicone rubber particulate mixture that is desired by the process of the present invention, the invention of the instant case provides a convenient and efficient process for forming a free-flowing particulate mixture in which the particles are essentially of uniform composition, which particles can be conveyed, handled and processed more efficiently and economically than was possible with the large massive mixtures that are obtained by the present day mixing and processing procedures that are used to manufacture silicone rubber compositions.

The examples below are given for the purpose of illustrating the invention and not for the purpose of determining the scope of the invention. All parts in the examples are by weight.

Example 1

To an 0.2 cubic foot working capacity Henschel mixer there are added 600 parts of 15,000,000 centipoise viscosity dimethylpolysiloxane polymer which is vinyldimethylsiloxy end-stopped, 276 parts of reinforcing silica aerogel, having a surface area of 300 square meters per part and 54 parts of a mixture of liquid process aids having the formulas,

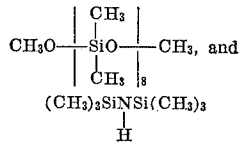

The mixer cover is closed and an open top funnel is attached to the cover of the mixer using no valve or closure of any kind between the funnel and the vessel. The mixing blades have a radius of about 4 inches. The mixer is started up and operated at a speed of 3800 rotations per minute. As mixing is begun, the filler slowly expands due to fluidization and rises in the funnel attached to the mixer cover. In about 3 minutes mixing time the filler begins to recede as air vents up through the funnel. Then another 276 parts of the same silica filler is added and in addition 54 parts of the foregoing process aids whose formulas are indicated above, which quantities are slowly poured into the funnel so that they feed by gravity into the mixer. After about an additional 5 minutes, it is found that all the additional filler has been mixed in with the diorganopolysiloxane gum and the process aid and the composition reduced to a free-flowing powder of about 20 pounds per cubic foot bulk density. The agitator is continued to be operated for an additional two minutes so that there is a total mixing time of 10 minutes, which additional mixing of two minutes is for the purpose of obtaining an essentially uniform heat vulcanizable silicone powder. The resulting powder had a particle size that varied from 10 to 80 microns with the average diameter having the range of 20 to 30. The powder from the mixer is then taken and placed on a two-roll rubber mill (10 inches x 24 inches) for 5 minutes. The mixture is then plasticized on the same mill for an additional 10 minutes. The resulting massed silicone rubber composition is strained in an extruder. Then the plasticized mass is taken and placed on a rubber mill where a curing agent, dicumyl peroxide, is added. The above curing agent is added on a rubber mill until the curing agent is completely homogeneously incorporated into the silicone rubber composition. The catalyzed silicone rubber composition into which is incorporated the curing agent is then taken from the mill in the form of sheets and the sheets are press cured for 15 minutes at 250° F. and are cured in an air oven at temperatures of about 150° C. for 1 hour. The cured heat vulcanizable silicone rubber composition is then tested and has the following physical properties:

Tensile (p.s.i.) _____ 1380
Elongation (percent) _____ 300
Hardness Shore A _____ 89
Tear Die B (pi) _____ 150

Example 2

Into a 3.5 cubic foot working capacity Henschel mixer which blades in the mixer have a radius of 11 inches, there is added approximately 26 parts of a 12 million centipoise dimethylpolysiloxane gum and 17 parts of treated reinforcing fumed silica filler having a surface area of 200 square meters per gram. The filler and diorganopolysiloxane gum are placed in the Henschel mixer. In this case, there is not utilized a funnel at the top of the mixer. The mixer is closed and the blade speed is operated at 1400 r.p.m. for 18 minutes. At the end of that time the mixer is stopped and there is discharged from the mixer a free-flowing silicone powder having a diameter in the range of 0.1 to 50 microns. The resulting powder is removed from the mixer and there is added to the mixer a second batch comprising about 14 parts of the dimethylpolysiloxane gum having a viscosity of 12,000,000 centipoise at 25° C., 41 parts of 5 micron ground quartz filler and 18 parts of a process aid of the formula,

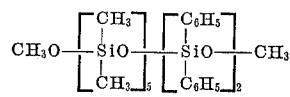

The resulting mixture of dimethylpolysiloxane polymer, ground quartz filler and the process aid is mixed for 13 minutes in the mixer. The blade speed is about 1400 r.p.m. No heating or cooling is utilized in the mixing cycle. At the end of 13 minutes of total mixing time, the mixer is stopped and there is added to the material in the mixer two parts of a 50% by weight 2,4-dichlorobenzoyl peroxide in a dimethylpolysiloxane oil having a viscosity of 2000 centipoise at 25° C. which is trimethylsiloxy end-stopped. The resulting mixture is then blended in the mixer for thirty seconds. At the end of that time, the first batch of powder is added to the powder that is present in the mixer and the total amount of ingredients is mixed for an additional time of one minute. After the one minute of additional mixing time of the two powder batches, the resulting powder that is formed has a bulk density of 35 pounds per cubic foot and the powder has an average size of 20 microns. There is present a total quantity of 50 pounds of powder. This total quantity of free-flowing silicone powder is then taken and placed on a two-roll mill and the powder is plasticized into sheets in about 5 minutes on the mill. The resulting sheets are then press cured for 15 minutes at 250° F. and then cured at a temperature of 150° C. in an air oven for 1 hour. The resulting sheets are then taken and tested for physical properties which physical properties for the tested sheets are as follows:

Tensile (p.s.i.) _____ 1010
Elongation (percent) _____ 190
Hardness Shore A _____ 72

Example 3

Into an 11.5 cubic foot working capacity Henschel mixer which blades in the mixer have a radius of 17 inches, there is added approximately 100 parts of a 10,000,000 centipoise dimethylpolysiloxane gum and 40 parts of treated reinforcing silica filler which is treated with a cyclic siloxane in accordance with the disclosure of the foregoing Lucas patent and having a surface area of 200 square meters per gram of filler. A funnel is utilized in this example. The mixer is operated with blade speed of 860 revolutions per minute for 3 minutes and then 40 more parts of treated reinforcing silica filler having a surface area of 200 square meters per gram of filler is poured into the mixer through the funnel while agitation continues. At this time, about 6 parts of a mixture of process aids of Example 1 are also poured into the mixer. After 6 minutes have elapsed, 10 parts of ground quartz and 5 parts of untreated precipitated silica are poured into the vessel without stopping the agitator rotation. After 8 minutes of total elapsed time, less than one total part of a mixture of a platinum flame retardant additive, pigment and iron oxide is added to the vessel. After 11 minutes elapsed time, 0.6% by weight dicumyl peroxide catalyst is added to the agitating vessel. At the end of 12½ minutes, the mixer is stopped and there is discharged from the mixer 200 parts of a free-flowing silicone rubber powder. The resulting powder has a bulk density of about 20 pounds per cubic foot and an average size of about 16 or 20 microns. The 200 parts of powder is placed on a two-roll mill in increments of about 10 parts and massed and plasticized in about 5 minutes per increment. The resulting silicone rubber is then pressed into sheets suitable for testing and cured in a press for 20 minutes at about 160° C. The resulting sheets are then tested for physical properties which physical properties are as follows:

Tensile (p.s.i.) ------------------------------ 1150
Elongation (percent) ------------------------ 270
Hardness Shore A --------------------------- 79
Tear Strength, Die B (pi) -------------------- 100
Tear Strength, Die C (pi) -------------------- 125

Example 4

Into a 300 cubic foot working capacity high intensity mixer which has blades in the mixer having a radius of 48 inches, there is added approximately 3000 parts of a 20,000,000 centipoise at 25° C. dimethylpolysiloxane gum and 1200 parts of treated reinforcing silica filler having a surface area of 300 square meters per gram. The mixer is operated with blade speed of 312 revolutions per minute for 3 minutes and then 1200 more parts of treated reinforcing silica filler having a surface area of 300 square meters per gram is poured into the mixer. At this time, about 180 parts of a mixture of the process aids of Example 1 are also poured into the mixer. After 6 minutes have elapsed, 300 parts of ground quartz and 150 parts of untreated precipitated silica are poured into the vessel without stopping the agitator's rotation. After 8 minutes elapsed time, 25 parts of a mixture of a platinum flame retardant additive, a pigment, and rare earth octoate ingredients are added to the agitating vessel. At the end of 12½ minutes the mixer is stopped and there is discharged from the mixer 6000 parts of a free-flowing silicone rubber powder. The resulting powder has a bulk density of about 17 pounds per cubic foot and the powder particles have an average size of about 20 microns. The 6000 parts of powder is placed on a two-roll mill in increments of about 100 parts and massed and plasticized in about 5 minutes per increment. The resulting silicone rubber is then pressed into sheets suitable for testing and cured in a press for 20 minutes at about 160° C. The resulting sheets are then tested for physical properties which physical properties are as follows:

Tensile (p.s.i.) ------------------------------ 1150
Elongation (percent) ------------------------ 290
Hardness Shore A --------------------------- 88
Tear Strength Die B (pi) --------------------- 160

Example 5

To an 0.2 cubic foot working capacity Henschel mixer there is added 600 parts of a 15,000,000 centipoise viscosity at 25° C. dimethylpolysiloxane polymer which is trimethylsiloxy-stopped, 60 parts of reinforcing silica aerogel having a surface area of 300 square meters per gram and 54 grams of a mixture of liquid process aids having the formulas,

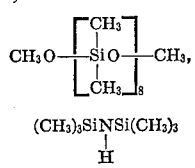

(CH₃)₃SiNSi(CH₃)₃
|
H

The mixing blades have a radius of 4 inches. The mixture is started up and is operated at a speed of 3800 rotations per minute. As mixing is begun, the filler slowly expands due to fluidization and rises in the mixing chamber. In about 2 minutes mixing time the filler began to recede as air is vented up through the funnel. During the first two minutes of mixing time, it was noted that very large clumps of the silicone polymer partially covered with filler will be formed. After about an additional 5 minutes, it is found that the clumps of filler and diorganopolysiloxane gum and process aid are reduced to smaller clumps of diorganopolysiloxane gum partially covered with process aid and filler which have a diameter of approximately 3½ inches, and had a bulk density of about 50 pounds per cubic foot. The agitator was continued to be operated for an additional 10 minutes so there was a total mixing time of 17 minutes, which additional mixing of 10 minutes was carried out for the purpose of obtaining clumps of the polymer covered with filler and the process aid which are as uniform as possible. After a total mixing time of 17 minutes, the agitator is stopped. The clumps that were in the mixer were examined and found to constitute large separate particles composed of lumps of the diorganopolysiloxane gum which lumps are non-uniformly covered with filler and process aids. Further, these lumps of the diorganopolysiloxane gum which were non-uniformly covered with filler had a tendency to mass together upon standing in the mixer and had a size that ranged from 1 inch in diameter to 2 to 3 inches in diameter. These lumps were taken from the mixer and placed on a two-roll rubber mill (10" x 24") for 5 minutes. The mixture was then plasticized on the same mill for an additional 10 minutes. The resulting silicone rubber composition was strained in an extruder, then the plasticized mass is taken and placed in a rubber mill where a curing agent, dicumyl peroxide, is added at a concentration of 6 parts to the plasticized mass. The above curing agent is added on the rubber mill until the curing agent is completely homogeneously incorporated into the silicone rubber composition. The silicone rubber composition into which is incorporated the curing agent was then taken from the mill in the form of sheets and the sheets were cured in an air oven at a temperature of about 150° C. which period of curing lasted for one hour. The cured heat vulcanizable silicone rubber composition is then tested and has the following physical properties:

Tensile (p.s.i.) ------------------------------ 300
Elongation (percent) ------------------------ 900
Hardness Shore A --------------------------- 15
Tear Strength, Die B (pi) -------------------- 30

Example 6

To an 0.2 cubic foot working capacity Henschel mixer there is added 800 parts of silanol-stopped dimethylpolysiloxane polymer of 100,000,000 centipoise viscosity, 160 parts of fumed silica which was treated with cyclic polysiloxanes as disclosed in the foregoing Lucas patent mentioned in the specification, which treated fumed silica has a surface area of 300 square meters per gram. Then there is added to this mixture 25.6 parts of methyltriacetoxysilane and 0.025 parts of dibutyl tin dilaurate. The mixer cover is closed and an open funnel is attached to the cover of the mixer using a valve between the funnel and the vessel. The mixing blades as stated previously with respect to this mixer had a blade radius of about 4 inches. The mixer is started up and operated at a speed of 3800 rotations per minute. Continuously during the process, the mixer as well as the other parts is completely enclosed and operated under a 2 millimeters vacuum such that the mixing cycle is carried out at essentially anhydrous conditions. After about 8 minutes, it is found that the filler has been mixed with the silanol-stopped dimethylpolysiloxane polymer and the composition reduced to a free-flowing powder of about 25 lbs. per cubic foot bulk density. The agitation is continued for an additional 3 minutes so that there is a total mixing time of 11 minutes, which additional mixing time of 3 minutes is for the purpose of obtaining an essentially uniform room temperature vulcanizable silicone powder. The powder is taken anhydrously out of the mixer after the total mixing time of 11 minutes and is examined carefully under the microscope and found to consist of essentially uniform aglomerates of the silanol-stopped diorganopolysiloxane with filler particles attached in an essentially uniform manner. These particles are found to have a size that varied from 4 to 75 microns in diameter with the average diameter being 16 to 23 microns. The powder is taken from the mixer anhydrously and placed on a two-roll rubber mill where it is massed anhydrously. The resulting plasticized composition is then formed into sheets and exposed to room temperature so that the sheets can cure into a silicone rubber elastomer. These sheets are allowed to cure for a period of 24 hours. At the end of the 24 hour period, the cured one-part room temperature vulcanizable silicone rubber sheets are tested and have the following physical properties:

Tensile (p.s.i.) _____ 450
Elongation (percent) _____ 450
Hardness, Shore A _____ 32
Tear Strength Die B (pi) _____ 40

What is claimed is:

1. A process for producing a free-flowing particulate mixture from a viscous, tacky and cohesive silicone polymer and fillers comprising (a) reducing said silicone polymer to particles of the size ranging from 0.1 microns to 25.4 millimeters; (b) mixing the particles of polymer with at least 15 parts of filler per 100 parts of the polymer; and (c) recovering the resultant free-flowing particulate mixture.

2. The process of Claim 1 where the polymer is a diorganopolysiloxane polymer where the organo groups are selected from the class consisting of monovalent hydrocarbon radicals, halogenated monovalent hydrocarbon radicals and cyanoalkyl radicals.

3. The process of Claim 1 wherein steps (a) and (b) are carried out simultaneously.

4. The process of Claim 2 wherein various silicone rubber additives are added to said polymer and filler prior to said polymer being reduced to particles.

5. The process of Claim 2 wherein various silicone rubber additives are added to said polymer and filler at the same time as said polymer is being reduced to particles.

6. The process of Claim 2 wherein the silicone polymer is reduced to particles at a temperature in the range of 0° to 100° C.

7. The process of Claim 2 wherein the silicone polymer is mixed with 20 to 900 parts of filler based on 100 parts of the silocone polymer.

8. The process of Claim 1, further comprising applying shearing force on said particulate mixture so as to form a cohesive mass.

9. The process of Claim 1 wherein said polymer is reduced to particles with mechanical shearing means.

10. The process of Claim 9 wherein said shearing mass is a high speed mechanical agitation.

11. The process of Claim 10 wherein the polymer is a silicone polymer and said silicone polymer is reduced to particles at a temperature in the range of 25° C. to 60° C.

12. The process of Claim 11 wherein the silicone polymer is an organopolysiloxane polymer having a viscosity of 100,000 centipoise to 200,000,000 centipoise at 25° C. and of the formula,

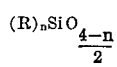

where R is selected from the class consisting of monovalent hydrocarbon radicals, halogenated monovalent hydrocarbon radicals and cyanoalkyl radicals, $n$ varies from 1.95 to 2.01, inclusive.

13. The process of Claim 11 wherein the silicone polymer is an organopolysiloxane polymer having a viscosity from 1,000 to 10,000,000 centipoise at 25° C. and having the formula,

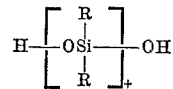

where R is selected from the class consisting of monovalent hydrocarbon radicals, halogenated monovalent hydrocarbon radicals and cyanoalkyl radicals and where $t$ varies from 300 to 5,200.

14. The process of Claim 11 wherein the reduction of said silicone polymer to particles takes place in a time range of 60 seconds to 60 minutes.

15. The process of Claim 14 wherein the filler is reinforcing filler which is selected from the class consisting of fumed silica, treated fumed silica, precipitated silica, treated precipitated silica, silica aerogel, treated silica aerogel and mixtures thereof.

16. The process of Claim 14 wherein the filler is an extending filler which is selected from the class consisting of titanium dioxide, lithopone, zinc oxide, zirconium silicate, iron oxide, diatomaceous earth, calcium carbonate, glass fibers, magnesium oxide, chromic oxide, zirconium oxide, aluminum oxide, crushed quartz, calcined clay, asbestos, carbon, graphite, cork, cotton and synthetic fibers.

17. The process of Claim 15 wherein the filler has a hydroxyl and absorbed water content of 0.2 to 4.0 percent by weight and a surface area of at least 10 square meters per gram.

18. The free-flowing particulate mixture produced by the process of Claim 1 wherein the particles have a size that is in the range of 0.1 microns to 25.4 millimeters and wherein the particles are essentially spherical agglomerates of an essentially uniform composition with an internal portion of polymer which is uniformly covered with filler and wherein when shearing force is applied to said particles the particles will form a cohesive mass.

19. The free-flowing particulate mixture of Claim 18 wherein the particles have a size that is in the range of 0.1 to 4000 microns.

20. The free-flowing particulate mixture produced by the process of Claim 4 wherein the composition of the particles is essentially uniform and the particles have a size in the range of 0.1 microns to 25.4 millimeters, which particles are essentially spherical having a center polymer portion uniformly coverered with filler and the silicone additives.

21. The free-flowing particulate mixture produced by the process of Claim 5 wherein the composition of the particles is essentially uniform and the particles have a size in the range of 0.1 microns to 25.4 millimeters which particles are essentially spherical with a center polymer portion uniformly covered with filler and silicone additives.

22. A process for producing a free-flowing silicone particulate mixture comprising (a) adding from 20 to 900 parts of a filler selected from the class consisting of reinforcing fillers and extending fillers and mixtures thereof to 100 parts of an organopolysiloxane polymer having a viscosity of 100,000 centipoise to 200,000,000 centipoise at 25° C. of the formula,

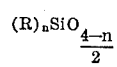

where R is selected from the class consisting of monovalent hydrocarbon radicals, halogenated monovalent hydrocarbon radicals and cyanoalkyl radicals, $n$ varies from 1.95 to 2.01, inclusive, (b) reducing said filler and organopolysiloxane with mechanical shear means having a mixing blade radius that may vary from 1 inch to 108 inches and said shear means has a blade speed that may vary from 40 rotations per minute to 25,000 rotations per minute until there is formed a free-flowing particulate mixture.

23. The process of Claim 22 wherein said reducing step is carried out for a period of time that may vary from 60 seconds to 60 minutes.

24. The process of Claim 22 wherein said mechanical shear means is a high speed agitator that has a blade radius that may vary from 3 inches to 24 inches and a blade speed that may vary from 400 rotations per minute to 8000 rotations per minute.

25. The process of Claim 22 wherein there is utilized 30 to 150 parts of filler per 100 parts of the organopolysiloxane.

26. The process of Claim 23 wherein said reducing step is carried out for a period of 2 to 30 minutes.

27. The process of Claim 22 wherein the reinforcing filler is selected from the class consisting of fumed silica, treated fumed silica, precipitated silica, treated precipitated silica, silica aerogels, treated silica aerogels, and mixtures thereof.

28. The process of Claim 22 wherein the extending filler is selected from the class consisting of titanium dioxide, lithopone, zinc oxide, zirconium silicate, iron oxide, diatomaceous earth, calcium carbonate, glass fibers, magnesium oxide, chromic oxide, zirconium oxide, aluminum oxide, crushed quartz, calcined clay, asbestos, carbon, graphite, cork, cotton and synthetic fibers.

29. The process of Claim 22 wherein the reduction step is carried out at a temperature that does not exceed 60° C.

30. The process of Claim 22 wherein the filler has a hydroxyl and absorbed water content of 0.2 to 4.0 percent by weight and a surface area of at least 10 square meters per gram.

31. The process of Claim 29 wherein the temperature of reduction is in the range of 25° to 40° C.

32. A silicone particulate mixture produced in accordance with the process of Claim 22 having a bulk density of 0.5 to 100 pounds per cubic foot and a particle size of 0.1 microns to 25.4 millimeters.

33. The process of Claim 22 wherein there is also added to said mixture of filler and organopolysiloxane 1 to 25% by weight of said organopolysiloxane of a silicone process aid.

34. The process of Claim 22 wherein there is also added to said mixture of filler and organopolysiloxane, 0.1 to 10% by weight based on said organopolysiloxane of a curing catalyst.

35. The process of Claim 22 wherein there is also added to said mixture of filler and organopolysiloxane at a concentration of 0.1 to 10% by weight of said organopolysiloxane an additive selected from the class consisting of self-bonding additives, heat stabilizer additives, flame retardant additives, and mixtures thereof.

36. A process for producing silicone polymer powder comprising (a) adding from 20 to 900 parts of a filler selected from the class consisting of reinforcing fillers and extending fillers and mixtures thereof, to 100 parts of an organopolysiloxane polymer having a viscosity of from 1,000 to 10,000,000 centipoise at 25° C. and having the formula,

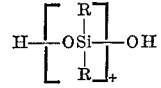

where R is selected from the class consisting of monovalent hydrocarbon radicals, halogenated monovalent hydrocarbon radicals and cyanoalkyl radicals, where $t$ varies from 300 to 5,260; (b) reducing said filler and organopolysiloxane with mechanical shear means having a mixing blade radius that may vary from 1 inch to 108 inches and said shear means has a blade speed that may vary from 40 rotations per minute to 25,000 rotations per minute until there is formed a free-flowing particulate mixture.

References Cited

UNITED STATES PATENTS 3,714,204   1/1973   Lamont ---------- 260—375 B

MORRIS LIEBMAN, Primary Examiner

S. M. PERSON, Assistant Examiner

U.S. Cl. X.R.

260—46.5 G

UNITED STATES PATENT AND TRADEMARK OFFICE
CERTIFICATE OF CORRECTION

PATENT NO. : 3,824,208
DATED : July 16, 1974
INVENTOR(S) : Ernest A. Link and Marcel P. Scarbel It is certified that error appears in the above-identified patent and that said Letters Patent are hereby corrected as shown below:

Column 5, line 30, delete "2.1" and substitute therefore
- 2.01 -

Column 5, line 62, delete "0.5" and substitute therefore
- 0.1 -

Column 5, line 72, delete "15" and substitute therefore
- 20 -

Column 8, line 15, delete "24" and substitute therefore
- 17 -

Column 27, line 6, delete "24" and substitute therefore
- 17 -

Column 28, line 25, delete "5,260" and substitute therefore
- 5,210 -

Signed and Sealed this

*third* Day of *February 1976*

[SEAL]

Attest:

RUTH C. MASON
*Attesting Officer*

C. MARSHALL DANN
*Commissioner of Patents and Trademarks*